(12) United States Patent
Tsuda

(10) Patent No.: US 12,075,344 B2
(45) Date of Patent: Aug. 27, 2024

(54) RADIO COMMUNICATION DEVICE, RADIO COMMUNICATION METHOD, AND RADIO COMMUNICATION SYSTEM

(71) Applicant: SONY GROUP CORPORATION, Tokyo (JP)

(72) Inventor: Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 289 days.

(21) Appl. No.: 17/608,565

(22) PCT Filed: Apr. 16, 2020

(86) PCT No.: PCT/JP2020/016798
§ 371 (c)(1),
(2) Date: Nov. 3, 2021

(87) PCT Pub. No.: WO2020/230511
PCT Pub. Date: Nov. 19, 2020

(65) Prior Publication Data
US 2022/0232465 A1    Jul. 21, 2022

(30) Foreign Application Priority Data
May 15, 2019    (JP) ................. 2019-092065

(51) Int. Cl.
*H04W 48/18*    (2009.01)
*H04W 64/00*    (2009.01)
*H04W 84/06*    (2009.01)

(52) U.S. Cl.
CPC ......... *H04W 48/18* (2013.01); *H04W 64/006* (2013.01); *H04W 84/06* (2013.01)

(58) Field of Classification Search
CPC .... H04W 48/18; H04W 64/006; H04W 84/06
See application file for complete search history.

(56) References Cited

U.S. PATENT DOCUMENTS

| | | | |
|---|---|---|---|
| 9,305,280 | B1 | 4/2016 | Berg et al. |
| 2003/0032426 | A1 | 2/2003 | Gilbert et al. |
| 2006/0030311 | A1 | 2/2006 | Cruz |
| 2007/0123252 | A1 | 5/2007 | Tronc |
| 2016/0300493 | A1 | 10/2016 | Ubhi |
| 2017/0337219 | A1 | 11/2017 | Ubhi |

(Continued)

FOREIGN PATENT DOCUMENTS

| | | |
|---|---|---|
| CN | 104396281 A | 3/2015 |
| CN | 107251452 A | 10/2017 |

(Continued)

OTHER PUBLICATIONS

International Search Report and Written Opinion of PCT Application No. PCT/JP2020/016798, issued on Jun. 23, 2020, 08 pages of ISRWO.

(Continued)

*Primary Examiner* — Curtis B Odom
(74) *Attorney, Agent, or Firm* — CHIP LAW GROUP

(57) ABSTRACT

A radio communication device including a measurement unit that measures a value specifying an altitude, and an altitude determination unit that determines whether to connect to a terrestrial network or a non-terrestrial network based on the value measured by the measurement unit.

19 Claims, 9 Drawing Sheets

(56) References Cited

U.S. PATENT DOCUMENTS

2018/0227814 A1    8/2018  Reial
2019/0090180 A1*   3/2019  Judd ................... H04W 48/18

FOREIGN PATENT DOCUMENTS

| | | |
|---|---|---|
| CN | 110476455 A | 11/2019 |
| CN | 110637479 A | 12/2019 |
| JP | 2012-060342 A | 3/2012 |
| JP | 2018-191089 A | 11/2018 |
| TW | 201837494 A | 10/2018 |
| WO | WO-2018167351 A1 | 9/2018 |
| WO | 2018/198540 A1 | 11/2018 |
| WO | WO-2018202183 A1 | 11/2018 |
| WO | 2019/065814 A1 | 4/2019 |

OTHER PUBLICATIONS

Thales, Dish Network, "Non Terrestrial Network Use Cases and Deployment Scenarios", 3GPP tsg_ran\WG1_RL1, No. TSGR1_88b Mar. 24, 2017, R1-1705779.

Thales, "TR 38.821 v0.2.0", R3-186269, 3GPP tsg_ran\wg3_iu, No. tsgr3_101bis Oct. 25, 2018.

* cited by examiner

RADIO COMMUNICATION DEVICE, RADIO COMMUNICATION METHOD, AND RADIO COMMUNICATION SYSTEM

CROSS REFERENCE TO RELATED APPLICATIONS

This application is a U.S. National Phase of International Patent Application No. PCT/JP2020/016798 filed on Apr. 16, 2020, which claims priority benefit of Japanese Patent Application No. JP 2019-092065 filed in the Japan Patent Office on May 15, 2019. Each of the above-referenced applications is hereby incorporated herein by reference in its entirety.

FIELD

The present disclosure relates to a radio communication device, a radio communication method, a program, and a radio communication system.

BACKGROUND

Conventionally, the radio communication device has been developed for applications on the ground. Therefore, cellular networks have been designed and deployed to accommodate radio communication devices that perform movements on the ground.

On the other hand, there have been recently developed a radio communication device, such as an unmanned aerial vehicle (UAV) represented by a drone, difficult to be defined as a radio communication device that performs movement on the ground.

In the third generation partnership project (3GPP), a work-item referred to as enhanced LTE support for aerial vehicles (RP-172826) was launched in Rel-15 to implement standardization work. In addition, the fifth generation (5G) mobile communication system started to examine an attempt to utilize a network using not only a cellular network but also an artificial satellite and a high altitude platform.

In the technique described in Patent Literature 1, when an aircraft is in flight, the aircraft receives voice and data services via a satellite from the viewpoint of FCC regulation. In addition, when the aircraft is on the ground, the service is received from a cellular system on the ground from a viewpoint of cost. In order to implement these, switching from a satellite to a cellular system on the ground is performed when the aircraft is on the ground. Patent Literature 1 only determines whether the aircraft is on the ground or not, that is, whether the altitude is zero (refer to Patent Literature 1).

CITATION LIST

Patent Literature

Patent Literature 1: US 2003/0032426 A

SUMMARY

Technical Problem

However, even when the radio communication device is in the air, in a case where the altitude is low (for example, several meters, several tens of meters, or several hundreds of meters), connecting to a cellular system on the ground might achieve better communication quality compared with a case of performing radio communication with a base station device such as a satellite.

The present disclosure has been made in view of such circumstances, and aims to provide a radio communication device, a radio communication method, a program, and a radio communication system capable of selecting an appropriate network from among a terrestrial network and a non-terrestrial network as a network as a connection destination appropriate for a situation.

Solution to Problem

One embodiment of the present disclosure is a radio communication device that includes: a measurement unit that measures a value specifying an altitude; and
an altitude determination unit that determines whether to connect to a terrestrial network or a non-terrestrial network based on the value measured by the measurement unit.

One embodiment of the present disclosure is that in the radio communication device, the altitude determination unit determines whether to connect to a terrestrial network or to a non-terrestrial network based on a threshold related to the altitude and the value measured by the measurement unit.

One embodiment of the present disclosure is that in the radio communication device, further comprising a threshold setting unit that sets the threshold based on information notified from a base station device.

One embodiment of the present disclosure is that in the radio communication device, the threshold is a value larger than zero (0).

One embodiment of the present disclosure is that in the radio communication device, further comprising a selection execution unit that selects a network, wherein the selection execution unit selects the terrestrial network when the altitude determination unit has determined to connect to the terrestrial network, and selects the non-terrestrial network when the altitude determination unit has determined to connect to the non-terrestrial network.

One embodiment of the present disclosure is that in the radio communication device, when the terrestrial network is selected, the selection execution unit determines whether the device is located inside or outside a range of a base station device of the terrestrial network, and when the device has been determined to exist outside the range of the base station device of the terrestrial network, the selection execution unit selects the non-terrestrial network.

One embodiment of the present disclosure is that in the radio communication device, when selecting the terrestrial network, the selection execution unit selects one network from among one or more networks to each of which identification information of the terrestrial network is allocated.

One embodiment of the present disclosure is that in the radio communication device, when selecting the non-terrestrial network, the selection execution unit selects one network from among one or more networks to each of which identification information of the non-terrestrial network is allocated.

One embodiment of the present disclosure is that in the radio communication device, the selection execution unit selects the one network based on a priority set for two or more networks to each of which the identification information of the non-terrestrial network is allocated.

One embodiment of the present disclosure is that in the radio communication device, further comprising a type determination unit that determines whether a type is a terrestrial type or a non-terrestrial type, wherein the measurement unit measures the value when the type determination unit has determined the type as the non-terrestrial type.

One embodiment of the present disclosure is that in the radio communication device, the type determination unit determines the type based on subscription information.

One embodiment of the present disclosure is that in the radio communication device, the type determination unit determines the type based on subscription information.

the non-terrestrial network is a network utilizing an artificial satellite belonging to a low Earth orbit, a medium Earth orbit, a geostationary Earth orbit, or a highly elliptical orbit, or utilizing a high altitude platform including an unmanned aircraft system.

One embodiment of the present disclosure is a radio communication method that includes: measuring, by a radio communication device, a value specifying altitude; and determining, by the radio communication device, whether to connect to a terrestrial network or a non-terrestrial network based on the measured value.

One embodiment of the present disclosure is a program that provides to cause a computer system to execute processes for connecting to a network, the program being configured to acquire a result of measuring a value specifying an altitude and to determine whether to connect to a terrestrial network or a non-terrestrial network based on the acquired value.

One embodiment of the present disclosure is a radio communication system that includes: a radio communication device; a terrestrial network; and a non-terrestrial network, wherein the radio communication device includes: a measurement unit that measures a value specifying an altitude; and an altitude determination unit that determines whether to connect to the terrestrial network or connect to the non-terrestrial network based on the value measured by the measurement unit.

DESCRIPTION OF EMBODIMENTS

Figure 1:
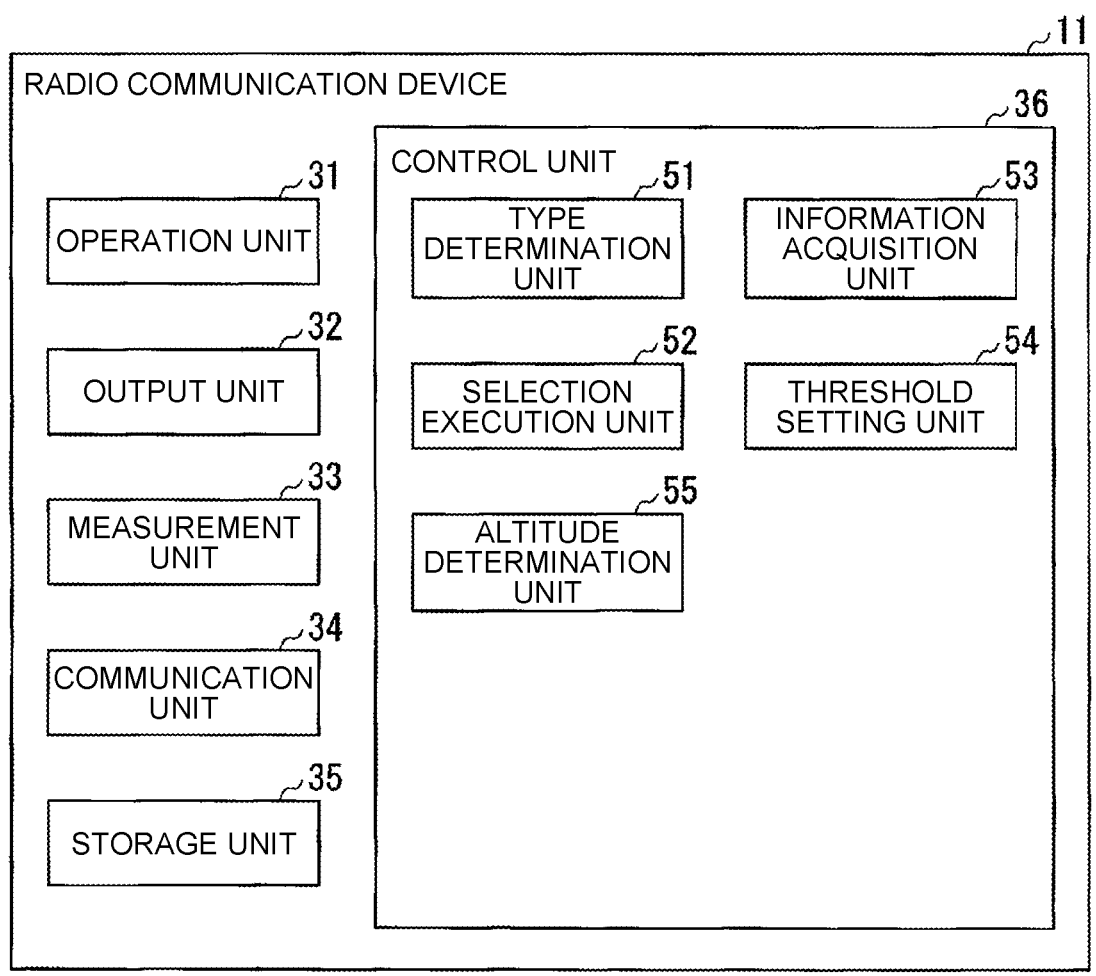
FIG. 1 is a diagram illustrating an example of functional blocks of a radio communication device according to an embodiment of the present disclosure.

Hereinafter, embodiments of the present disclosure will be described with reference to the drawings.

[Overview of Radio Communication System]

In the present embodiment, a radio communication system that applies long time evolution (LTE) and new radio (NR) will be described as an example.

The radio communication system according to the present embodiment includes a radio communication device that moves on the ground and a radio communication device that moves in the air. Note that the radio communication device that moves in the air may exist on the ground when not moving in the air.

In the present embodiment, for convenience of description, a terrestrial User Equipment, which is a radio communication device that moves on the ground, will be referred to as a terrestrial radio communication device.

In addition, in the present embodiment, for convenience of description, non-terrestrial User Equipment, which is a radio communication device that moves in the air, will be referred to as a non-terrestrial radio communication device.

Incidentally, a radio communication device is also referred to as user equipment (UE).

Here, in the present embodiment, the non-terrestrial radio communication device is defined to broadly include radio communication devices other than terrestrial radio communication devices. In addition, an unmanned aerial vehicle (UAV) or aerial UE is one aspect of the radio communication device belonging to the non-terrestrial radio communication device.

In addition, the radio communication system according to the present embodiment includes a terrestrial network and a non-terrestrial network.

In the present embodiment, for convenience of description, a terrestrial network will be referred to as a TN.

In addition, for convenience of description, a non-terrestrial network will be referred to as an NTN in the present embodiment.

Here, the TN is a network constructed for a terrestrial radio communication device. The NTN is a network constructed for a non-terrestrial radio communication device.

Examples of the NTN include: a network utilizing artificial satellites belonging to any of low Earth orbits (LEO), medium Earth orbits (MEC)), geostationary Earth orbits (GEO), or highly elliptical orbits (HEO); and a network utilizing high altitude platforms (HAPs) including an unmanned aircraft system (UAS).

In a case where low Earth orbiting satellites, medium Earth orbiting satellites, geostationary Earth orbiting satellites, highly elliptical orbiting satellites, or high altitude platforms are individually operated by different service operators, NTN identification information (for convenience of description, referred to as NTN ID) different from each other is allocated to each of the networks. Accordingly, it is possible to select, in the radio communication system, a network belonging to a specific NTN ID based on subscription information. Here, Public Land Mobile Network (PLMN) ID may be used instead of the NTN ID.

In contrast, in a case where a single service operator has at least two providing means out of the low Earth orbiting satellite, the medium Earth orbiting satellite, the geostationary Earth orbiting satellite, the highly elliptical orbiting satellite, and the high altitude platform, it would be allowable to allocate either different NTN IDs or an identical NTN ID to these networks.

Here, in a case where different NTN IDs are allocated to two providing means, the service operator may set the order (priority) of the networks to be preferentially selected, such as a primary NTN ID to be prioritized first and a secondary NTN ID to be prioritized second, for each of the NTN IDs.

Furthermore, in a case where an identical NTN ID is allocated to two providing means, different levels of priority may be set by the service operator depending on a difference in the NTN provision means, that is, whether the network is provided by the low Earth orbiting satellite, the medium Earth orbiting satellite, the geostationary Earth orbiting satellite, the highly elliptical orbiting satellite, or the high altitude platform.

Such priority information may be set, for example, in identification information (for convenience of description, referred to as cell ID) allocated to a cell provided by a providing means of the NTN, such as primary cell ID and secondary cell ID. Furthermore, in addition to or instead of the cell, priority information may be set in identification information (for convenience of description, referred to as beam ID) allocated to a beam, such as primary beam ID and secondary beam ID.

In the present embodiment, in a radio communication device 11, in a case where there are two or more networks to which identification information of the non-terrestrial network is allocated, a selection execution unit 52 may select one network based on the priority set for each of the two or more networks. The selection execution unit 52 may select one network having the highest priority, for example.

Here, in addition to the functions of the terrestrial radio communication device, the non-terrestrial radio communication device in the present embodiment schematically includes an aerial mobility function and an altitude measurement function.

Accordingly, for convenience of description, the present embodiment uses an example of functional blocks of the non-terrestrial radio communication device, thereby collectively describing configurations and operations of the terrestrial radio communication device and the non-terrestrial radio communication device.

Incidentally, the terrestrial radio communication device may also have a function related to aerial mobility similarly to the non-terrestrial radio communication device.

In addition, it is also allowable to use a radio communication device capable of switching between a setting to operate as a terrestrial radio communication device and a setting to operate as a non-terrestrial radio communication device. Such switching may be implemented by a predetermined device of a network giving a switching instruction to the radio communication device via a base station device. As a specific example, the predetermined device may perform such switching by rewriting, via the base station device, software (for example, a program) that controls operations in the radio communication device.

As an example, it is also allowable to use a radio communication device having a flight function, in which switching is made on the radio communication device so as to be set to operate as a terrestrial radio communication device when the flight function is not utilized. In addition, switching may be made on the radio communication device so as to be set to operate as a non-terrestrial radio communication device when the flight function is utilized.

[Overview of Radio Communication Device]

FIG. 1 is a diagram illustrating an example of functional blocks of a radio communication device 11 according to the embodiment of the present disclosure.

The radio communication device 11 includes an operation unit 31, an output unit 32, a measurement unit 33, a communication unit 34, a storage unit 35, and a control unit 36.

The control unit 36 includes, as examples of main functional units, a type determination unit 51, a selection execution unit 52, an information acquisition unit 53, a threshold setting unit 54, and an altitude determination unit 55.

The operation unit 31 includes a key or the like operated by a person who uses the radio communication device 11 (in the present embodiment, referred to as a user for convenience of description).

The output unit 32 includes a screen by which an image is output and a speaker by which a sound is output.

Note that the operation unit 31 and the output unit 32 may be constituted with a touch panel, for example.

The measurement unit 33 measures a value of a predetermined measurement target or a value of a measurement target set by the network via the base station device. The measurement unit 33 is constituted with one or more sensors that detect the value.

Here, the measurement unit 33 may detect a value of a measurement target, or may detect values of two or more different measurement targets, for example.

In the present embodiment, the measurement unit 33 measures a value specifying the altitude. The value may be directly expressed by a value of the altitude, or may be a value of the atmospheric pressure. In a case where the value of the atmospheric pressure is used, the measurement unit 33 may include a barometer that measures the atmospheric pressure as a sensor.

The communication unit 34 communicates with a communication partner device by radio communication. In the present embodiment, a communication partner device for the radio communication device 11 is a base station device in the TN or NTN.

The storage unit 35 stores various types of information. The storage unit 35 may have a certain storage area, and in the present embodiment, for example, may be a subscriber identity module (SIM), may include a SIM and another storage device, or may be a storage device other than the SIM. Here, the SIM may be provided in a form of a universal subscriber identity module (USIM).

The control unit 36 performs various types of processes and control in the radio communication device 11.

Here, the control unit 36 includes a processor and performs various types of processes and control by executing a program stored in the storage unit 35 by the processor, for example.

Main functional units included in the control unit 36 will be described. Note that the control unit 36 performs necessary processes and control such as general processes and control of radio communication, for example, in addition to the processes and control by the functional unit described in the present embodiment.

The type determination unit 51 determines the type of the radio communication device 11 which is an own device. In the present embodiment, the types of the radio communication device 11 include at least a terrestrial type and a non-terrestrial type. Here, in the present embodiment, for convenience of description, the type of the terrestrial radio communication device will be referred to as terrestrial, and the type of the non-terrestrial radio communication device will be referred to as non-terrestrial.

As an example, information specifying the type (for convenience of description, referred to as type information) of the radio communication device 11 is stored in the storage unit 35 of the radio communication device 11. In this case, the type determination unit 51 determines the type based on the type information stored in the storage unit 35. Note that the type information may be stored in a SIM, for example, and in this case, the storage unit 35 includes the SIM. Here, the type information stored in the storage unit 35 may be one of UE capabilities.

As another example, the type information of the radio communication device 11 may be stored and managed in a storage unit of an external device such as a server device (not illustrated). In this case, in the radio communication device 11, the type determination unit 51 communicates with the external device by the communication unit 34, receives the type information of the radio communication device 11 from the external device, and determines the type based on the type information.

Incidentally, the type of the radio communication device 11 may be determined by subscription information, for example. Furthermore, in a case where the type of the radio communication device 11 is switchable, the type set as a result of switching at the time of execution of the type determination is to be managed and determined, for example.

The selection execution unit 52 executes a process of selecting a network to be a connection destination from among one or more various networks.

In addition, the selection execution unit 52 performs a process regarding a cell selection or a cell reselection procedure and a process of detecting information related to a cell existing in the neighborhood or the like.

Although the present embodiment describes a case where the selection execution unit 52 executes the various types of processes for convenience of description, it is allowable to assume a configuration to be executed by different functional blocks for each of processes.

The information acquisition unit 53 acquires various types of information. The information acquisition unit 53 acquires, for example, a value measured by the measurement unit 33 or information regarding the value, information included in a signal transmitted from an external device and received by the communication unit 34, and the like.

The threshold setting unit 54 sets a predetermined threshold. In the present embodiment, the threshold setting unit 54 sets a threshold related to the altitude, for example. Here, when the measurement unit 33 measures the value of the atmospheric pressure, a threshold related to the atmospheric pressure may be set as the threshold related to the altitude.

Note that, the threshold may be defined by using a value common to the plurality of radio communication devices 11 or by using a value that can vary for each of the radio communication devices 11.

For example, it is allowable to use a value that can vary for each of predetermined situations, such as vary for each of positions of the individual radio communication devices 11.

As an example, the threshold may be set to a value corresponding to the topography for each of the base station devices. Specifically, a status of interference given to neighboring cells due to radio communication such as random access varies depending on the arrangement of the base station device, and thus, the threshold may be set to be variable corresponding to the topography of the position where the base station device is installed. Furthermore, the threshold may be set to be variable for each frequency band, for example, each operation frequency band.

Here, in the radio communication device 11, the threshold related to the altitude is stored in the storage unit 35, for example.

For example, the threshold may be set in the radio communication device 11 in advance, or may be notified from a base station device or the like to the radio communication device 11 via system information and stored in the storage unit 35.

For example, a measurement configuration including threshold information related to the altitude may be set via a Radio Resource Control Signaling (RRC) message, such as RRC connection setup, RRC connection reconfiguration, or RRC connection re-establishment.

In this manner, the threshold setting unit 54 may set the threshold based on information transmitted from an external device such as a base station device or a server device and received by the communication unit 34.

The altitude determination unit 55 determines the high/low level of altitude. In the present embodiment, the altitude determination unit 55 specifies the altitude based on the value measured by the measurement unit 33. Then, the altitude determination unit 55 determines high/low level of altitude based on the specified altitude and the threshold related to the altitude. As the high/low level of the altitude, a magnitude relationship between the specified altitude and a threshold is used, for example.

Note that the altitude may be specified on estimation basis, for example.

Furthermore, in the present embodiment, the threshold regarding the altitude is set to a value larger than a value representing the altitude of the ground (for example, 0).

Here, in the present embodiment, the altitude above ground level is used as the altitude, but an altitude above sea level may be used as another example.

Furthermore, for example, in a case where the radio communication device 11 is equipped with a receiving device of a global navigation satellite system (GNSS) represented by a global positioning system (GPS), the measurement unit 33 may measure the altitude via the GNSS.

Here, when the radio communication device 11 is used as a terrestrial radio communication device, there is no need to include a function of detecting a value specifying the altitude by the measurement unit 33 or a function of determining the high/low level of altitude by the altitude determination unit 55, for example.

[Example of Operation in Radio Communication System]

Figure 2:
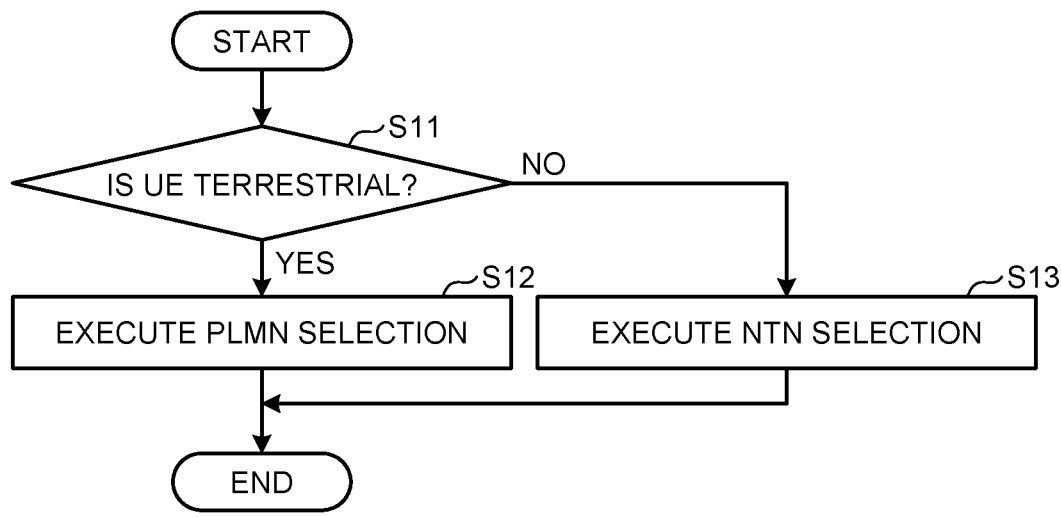
FIG. 2 is a diagram illustrating an example of a procedure of a network selection process performed in the radio communication device according to the embodiment of the present disclosure.

FIG. 2 is a diagram illustrating an example of a procedure of a network selection process performed in the radio communication device 11 according to the embodiment of the present disclosure.

The processes of the flow illustrated in FIG. 2 are performed immediately after the power of the radio communication device 11 is turned on, for example.

First, in the radio communication device 11, the type determination unit 51 determines whether the type of the radio communication device 11 is terrestrial (step S11).

When the type of the radio communication device 11 has been determined as terrestrial (step S11: YES) as a result of the above determination in the radio communication device 11, the selection execution unit 52 executes a selection process of the PLMN which is TN, as a network selection process (step S12). This ends the processes of this flow.

Here, the PLMN selection process is a process of selecting a network belonging to PLMN identification information (for convenience of description, referred to as PLMN ID) holding subscription from among a plurality of networks to each of which the PLMN ID is allocated.

The PLMN has a definition of network ID/code owned by individual operators, and this definition includes a country code referred to as mobile country code (MCC) and an operator code referred to as mobile network code (MNC), for example.

In contrast, when the type of the radio communication device 11 has not been determined as terrestrial (step S11: NO) as a result of the above determination in the radio communication device 11, the selection execution unit 52 executes a selection process of the NTN as a network selection process (step S13). This ends the processes of this flow.

Here, in the radio communication device 11, NTN selection is a process of selecting a network belonging to the NTN ID holding the subscription of the radio communication device 11 from among a plurality of networks to which the NTN ID is allocated. The network belonging to the NTN ID may be supported in a form of roaming with respect to the network belonging to the PLMN ID holding the subscription.

Figure 3:
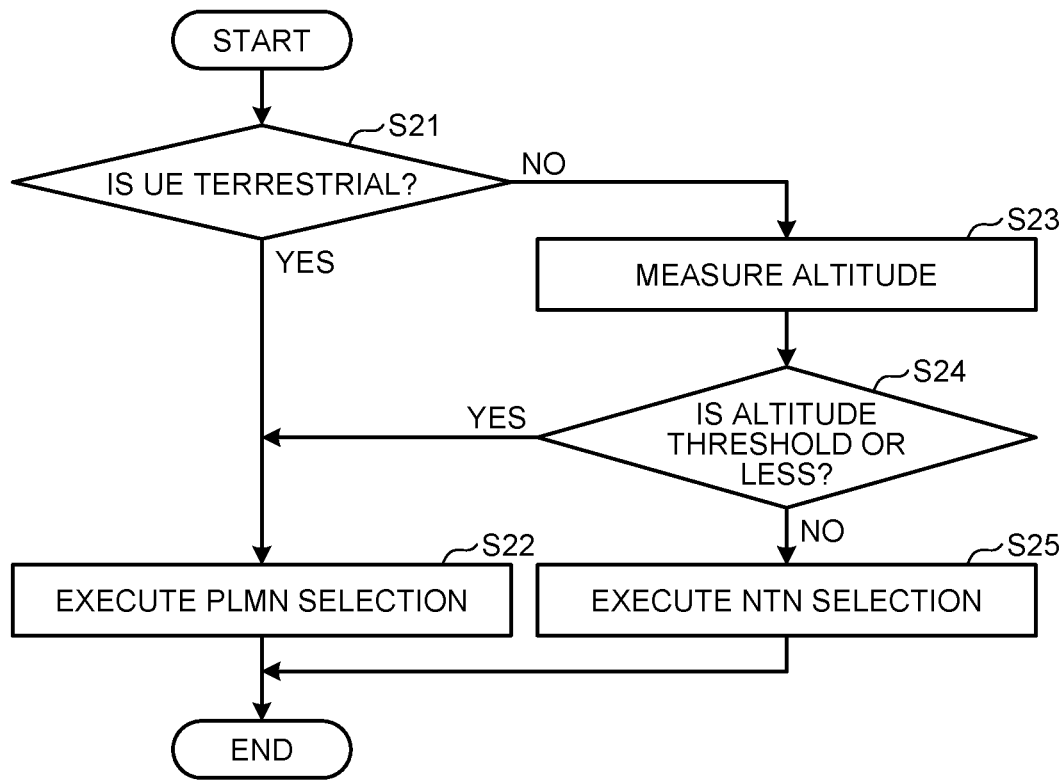
FIG. 3 is a diagram illustrating another example of the procedure of the network selection process performed in the radio communication device according to the embodiment of the present disclosure.

FIG. 3 is a diagram illustrating another example of a procedure of a network selection process performed in the radio communication device 11 according to the embodiment of the present disclosure.

First, in the radio communication device 11, the type determination unit 51 determines whether the type of the radio communication device 11 is terrestrial (step S21).

Note that the process in step S21 is similar to the process in step S11 illustrated in FIG. 2.

When the type of the radio communication device 11 has been determined as terrestrial (step S21: YES) as a result of the above determination in the radio communication device 11, the selection execution unit 52 executes a selection process of the PLMN, as a network selection process (step S22). This ends the processes of this flow.

Note that the process in step S22 is similar to the process in step S12 illustrated in FIG. 2.

In contrast, when the type of the radio communication device 11 has not been determined as the terrestrial (step S21: NO) as a result of the above determination in the radio communication device 11, a value specifying the altitude above ground level is measured by the measurement unit 33 (step S23). Subsequently, the process proceeds to step S24.

Here, in the radio communication device 11, the altitude determination unit 55 calculates and specifies the altitude above ground level based on the value measured by the measurement unit 33. Note that, when the value is the altitude above ground level itself, the altitude determination unit 55 specifies the value as the altitude above ground level.

In the present embodiment, it is assumed that the altitude above ground level measured in this manner is the altitude of the radio communication device 11 with respect to the ground.

Subsequently, in the radio communication device 11, the altitude determination unit 55 determines whether the specified altitude above ground level is a predetermined threshold or less (step S24).

When the specified altitude above ground level has been determined to be a predetermined threshold or less (step S24: YES) as a result of the above determination in the radio communication device 11, the selection execution unit 52 executes a selection process of the PLMN, as a network selection process (step S22). This ends the processes of this flow.

In contrast, when the specified altitude above ground level has not been determined to be the predetermined threshold or less, that is, determined to exceed the threshold (step S24: NO) as a result of the above determination in the radio communication device 11, the selection execution unit 52 executes a selection process of the NTN, as a network selection process (step S25). This ends the processes of this flow.

Note that the process in step S25 is similar to the process in step S13 illustrated in FIG. 2.

Note that it has been confirmed that as the altitude of the radio communication device 11 increases, more neighboring cells are observed by the radio communication device 11. For this reason, for example, there is a concern that random access accompanying initial access performed in an idle mode or update of a tracking area (TA) in the radio communication device 11 would cause a radio communication device flying at a higher altitude to give greater interference to the neighboring cells.

In this manner, the interference given to the neighboring cells depends on the cell deployment design. Therefore, it is desirable that the threshold related to the altitude used for determining whether to execute the PLMN selection or the NTN selection can be set for each of cells or each of base station devices, for example.

In the present embodiment, for convenience of description, update of the tracking area is referred to as TA update.

For example, the threshold related to the altitude may be provided to the radio communication device 11 via system information transmitted from each of base station devices by radio transmission. The radio communication device 11 in the idle mode may acquire the threshold by confirming a master information block (MIB) and a system information block (SIB), which are transmitted using a notification channel referred to as a broadcast control channel (BCCH) at an occurrence frequency set by the network before execution of random access accompanying initial access or TA update.

In such a case, with a comparison between the measured altitude with the threshold acquired via the MIB or the SIB, the radio communication device 11 can correctly select the network on which random access is to execute from among the TN and the NTN.

Furthermore, in the radio communication device 11, for example, it is allowable to set, in the storage unit 35 in advance, a default threshold to be used when the threshold cannot be acquired via the MIB or the SIB.

Furthermore, in the radio communication device 11, for example, it is allowable to set, in the storage unit 35 in advance, information specifying a default network as a network to be selected after the power of the radio communication device 11 is turned on. In the present embodiment, the default network is either a TN or an NTN network.

Figure 4:
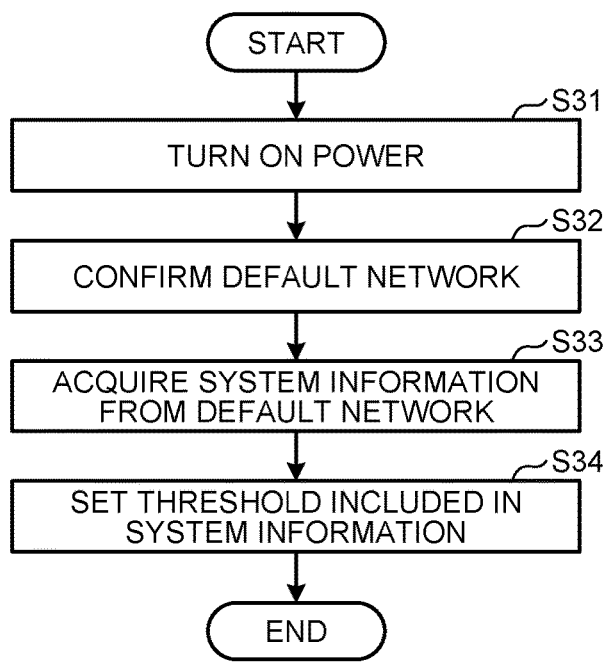
FIG. 4 is a diagram illustrating an example of a procedure of a threshold setting process regarding altitude performed after power is turned on in the radio communication device according to the embodiment of the present disclosure.

FIG. 4 is a diagram illustrating an example of a procedure of a threshold setting process regarding the altitude performed after power is turned on in the radio communication device 11 according to the embodiment of the present disclosure.

First, in the radio communication device 11, the power of the radio communication device 11 is turned from off to on (step S31). Subsequently, the process proceeds to step S32.

Here, the power switching from off to on in the radio communication device 11 may be performed, for example, either in response to user's power-on operation performed on the operation unit 31 or automatically by a timer automatic turn-on function, or the like.

Subsequently, in the radio communication device 11, the information acquisition unit 53 acquires information regarding a default network (step S32). The radio communication device 11 confirms the default network by the information. Subsequently, the process proceeds to step S33.

Incidentally, the information specifying the default network may be stored in a SIM, for example. In this case, the storage unit 35 includes the SIM. Here, the SIM may be provided in a form of a USIM. Alternatively, the radio communication device 11 may use an electronic subscriber information holding device referred to as an embedded SIM (eSIM), a soft SIM, or the like, instead of a SIM card, for example.

Subsequently, in the radio communication device 11, the information acquisition unit 53 acquires system information via a signal transmitted by the communication unit 34 with the base station device of the confirmed default network (step S33). Subsequently, the process proceeds to step S34. The default network may be either TN or NTN, for example.

Subsequently, in the radio communication device 11, the threshold setting unit 54 sets a threshold included in the acquired system information (step S34). This ends the processes of this flow.

Figure 5:
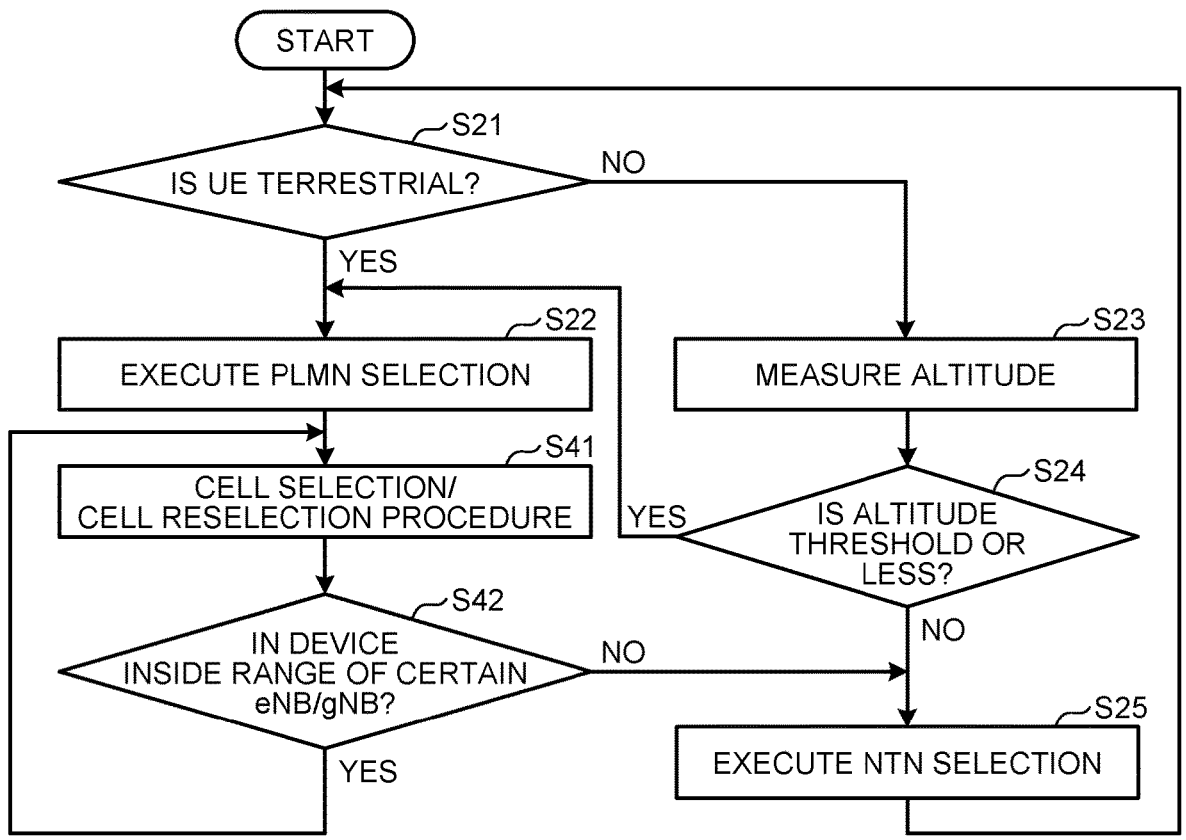
FIG. 5 is a diagram illustrating another example of the procedure of the network selection process performed in the radio communication device according to the embodiment of the present disclosure.

FIG. 5 is a diagram illustrating another example of the procedure of the network selection process performed in the radio communication device 11 according to the embodiment of the present disclosure.

The processes of steps S21 to S25 illustrated in FIG. 5 are similar to the processes of steps S21 to S25 illustrated in FIG. 3, respectively, and thus are denoted with the same reference numerals.

Note that, in the example of FIG. 5, after completion of the process of step S22, the process proceeds to step S41. In addition, in the example of FIG. 5, after completion of the process of step S25, the process proceeds to step S21.

Regarding the flow illustrated in FIG. 5, processes of step S41 to step S42 will be described.

In the radio communication device 11, after execution of the PLMN selection process in the process of step S22, the selection execution unit 52 executes a process of a cell selection/cell reselection procedure (step S41). Subsequently, the process proceeds to step S42.

Here, the cell selection is a process of selecting an appropriate cell for the radio communication device 11. In addition, cell reselection is a process of reselecting an appropriate cell for the radio communication device 11.

Subsequently, in the radio communication device 11, the selection execution unit 52 determines whether the radio communication device 11 exists within a range of a certain evolved NodeB (eNB) or gNodeB (gNB) belonging to the PLMN ID selected in the process of step S22 (step S42).

Note that the radio communication device 11 may determine whether the radio communication device 11 exists inside or outside the range (that is, not within the range) of the base station device based on the reception strength of a signal transmitted from the base station device by radio transmission or the presence or absence of reception of a predetermined signal transmitted from the base station device by radio transmission, for example.

Here, the eNB is a base station device that provides LTE.

Furthermore, the gNB is a base station device that provides new radio (NR) in an NR stand-alone Radio Access Network (RAN).

As a result of the above determination, when the radio communication device 11 has been determined to exist inside the range of a certain eNB or gNB (step S42: YES), the process proceeds to step S41.

In contrast, when the radio communication device 11 has not been determined to exist inside the range of the certain eNB or gNB (step S42: NO) as a result of the above determination, the process proceeds to step S25.

Here, in the present embodiment, in the radio communication device 11, for example, the processes of any one of the example of FIG. 2, the example of FIG. 3, or the example of FIG. 5 may be executed, or the processes of two or more flows may be switched and executed. Furthermore, the radio communication device 11 may execute processes of a flow different from these examples. The different flow may include individual processes in these examples in combination.

Figure 6:
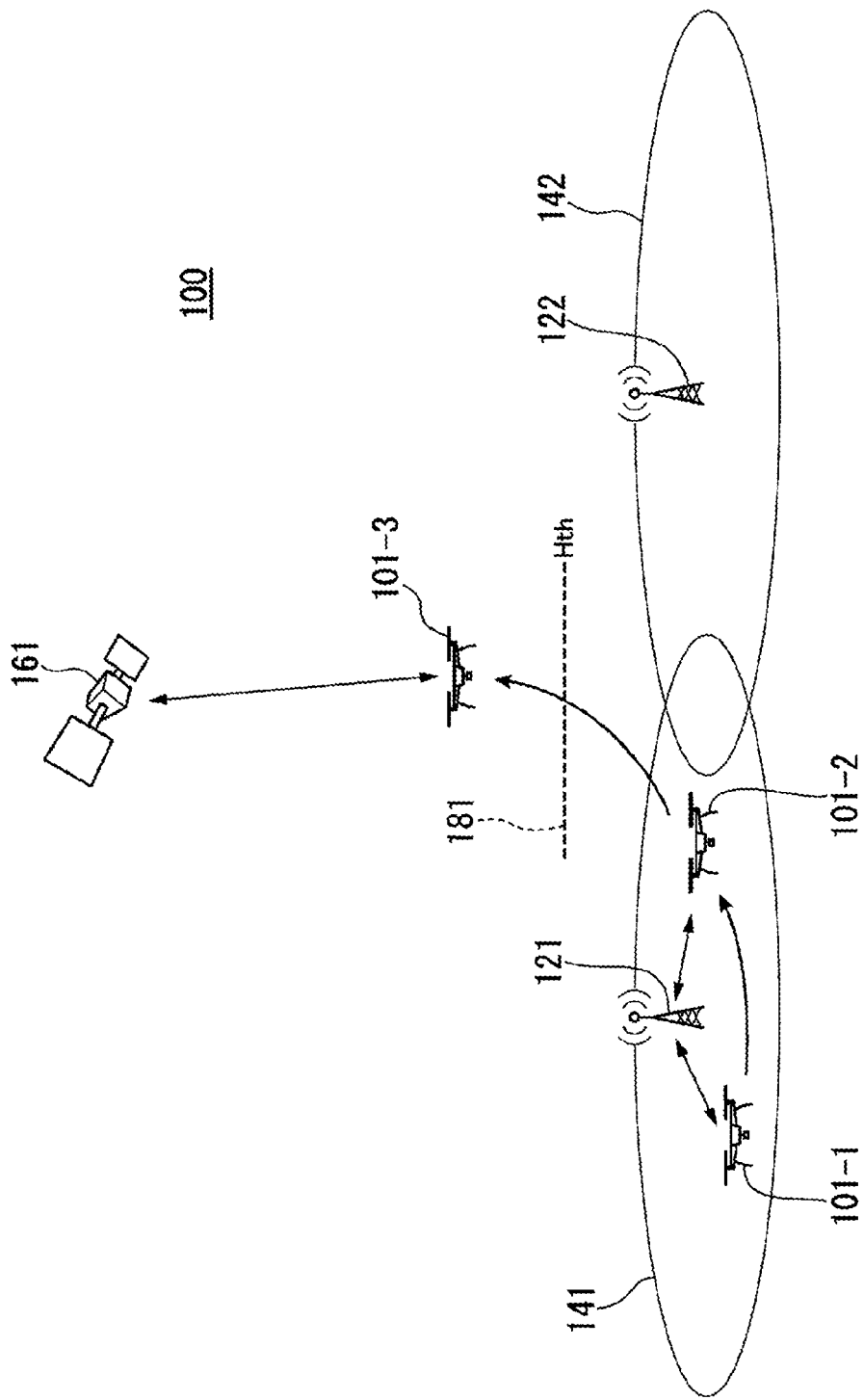
FIG. 6 is a diagram illustrating an example of mobility management regarding a non-terrestrial radio communication device according to the embodiment of the present disclosure.

FIG. 6 is a diagram illustrating an example of mobility management regarding a non-terrestrial radio communication device 101-1 according to the embodiment of the present disclosure. In the present embodiment, the non-terrestrial radio communication device 101-1 has a configuration similar to that of the radio communication device 11 illustrated in FIG. 1.

FIG. 6 illustrates, as a configuration example of a radio communication system 100, the non-terrestrial radio communication device 101-1 which is a drone, for example, a TN base station device 121, which is an eNB or a gNB, and a cell 141 of the TN base station device 121, a TN base station device 122, which is an eNB or a gNB, and a cell 142 of the TN base station device 122, and an NTN base station device 161 mounted on an artificial satellite.

FIG. 6 schematically illustrates a threshold altitude 181 corresponding to a threshold Hth of the altitude.

Here, a non-terrestrial radio communication device 101-2 and a non-terrestrial radio communication device 101-3 are each illustrated to represent the non-terrestrial radio communication device 101-1 after movement.

In the example of FIG. 6, first, the non-terrestrial radio communication device 101-1 exists at the position where the non-terrestrial radio communication device 101-1 is illustrated, then moves to the position where the non-terrestrial radio communication device 101-2 is illustrated, and thereafter moves to the position where the non-terrestrial radio communication device 101-3 is illustrated. The position of the non-terrestrial radio communication device 101-1 and the position of the non-terrestrial radio communication device 101-2 are at low levels such as on the ground or at aerial position (low altitude) which are levels of the threshold altitude 181 or less, and the position of the non-terrestrial radio communication device 101-3 is at an aerial (high altitude) position that exceeds the threshold altitude 181.

In an initial state, the non-terrestrial radio communication device 101-1 is at the position where the non-terrestrial radio communication device 101-1 is illustrated and exists in the cell covered by the base station device 121 constituting the TN. The non-terrestrial radio communication device 101-1 receives a TN radio communication service via the base station device 121.

Next, the non-terrestrial radio communication device 101-1 moves to the position where the non-terrestrial radio communication device 101-2 is illustrated.

In this case, in the non-terrestrial radio communication device 101-1, the processes of the flow illustrated in FIG. 3 is executed and it is determined whether the altitude is the threshold or less, for example. Here, the altitude of the position where the non-terrestrial radio communication device 101-2 is illustrated is the threshold Hth or less. Therefore, the non-terrestrial radio communication device 101-1 receives the radio communication service of the TN via the base station device 121 constituting the TN.

Next, the non-terrestrial radio communication device 101-1 moves to a position where the non-terrestrial radio communication device 101-3 is illustrated.

In this case, in the non-terrestrial radio communication device 101-1, the processes of the flow illustrated in FIG. 3 is executed and it is determined whether the altitude is the threshold or less, for example. Here, the altitude at the position where the non-terrestrial radio communication device 101-3 is illustrated is not the threshold Hth or less, but exceeds the threshold Hth. Accordingly, the non-terrestrial radio communication device 101-1 receives the radio communication service of the NTN via the base station device 161 constituting the NTN. Here, the NTN base station device 161 mounted on an artificial satellite may have a form of a relay station device that relays a signal transmitted from a ground station device (not illustrated) to the non-terrestrial radio communication device 101-3 and relays the signal transmitted from the non-terrestrial radio communication device 101-3 to the ground station device.

Figure 7:
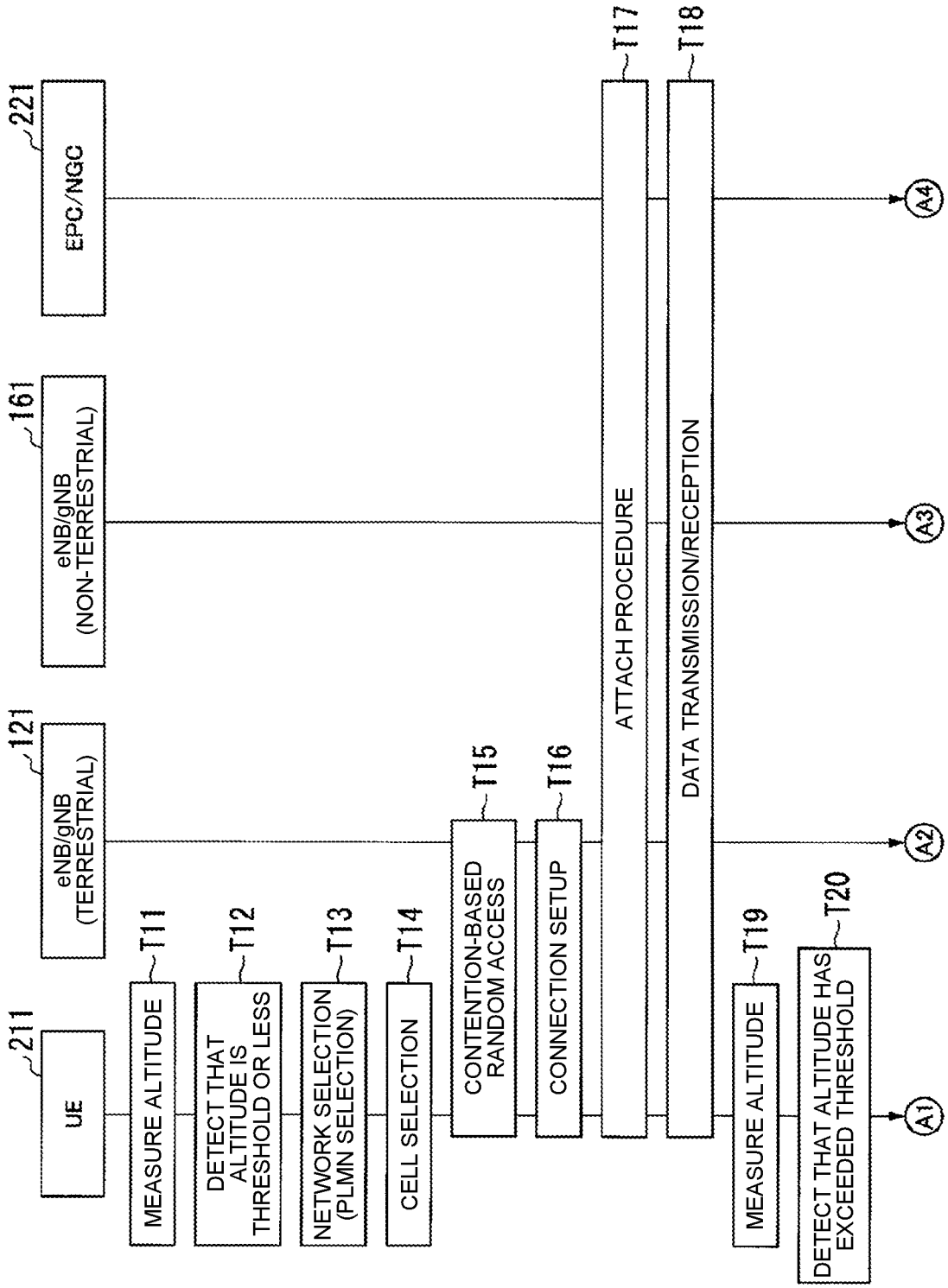
FIG. 7 is a diagram illustrating an example of processes performed after power is turned on in the non-terrestrial radio communication device according to the embodiment of the present disclosure.
Figure 8:
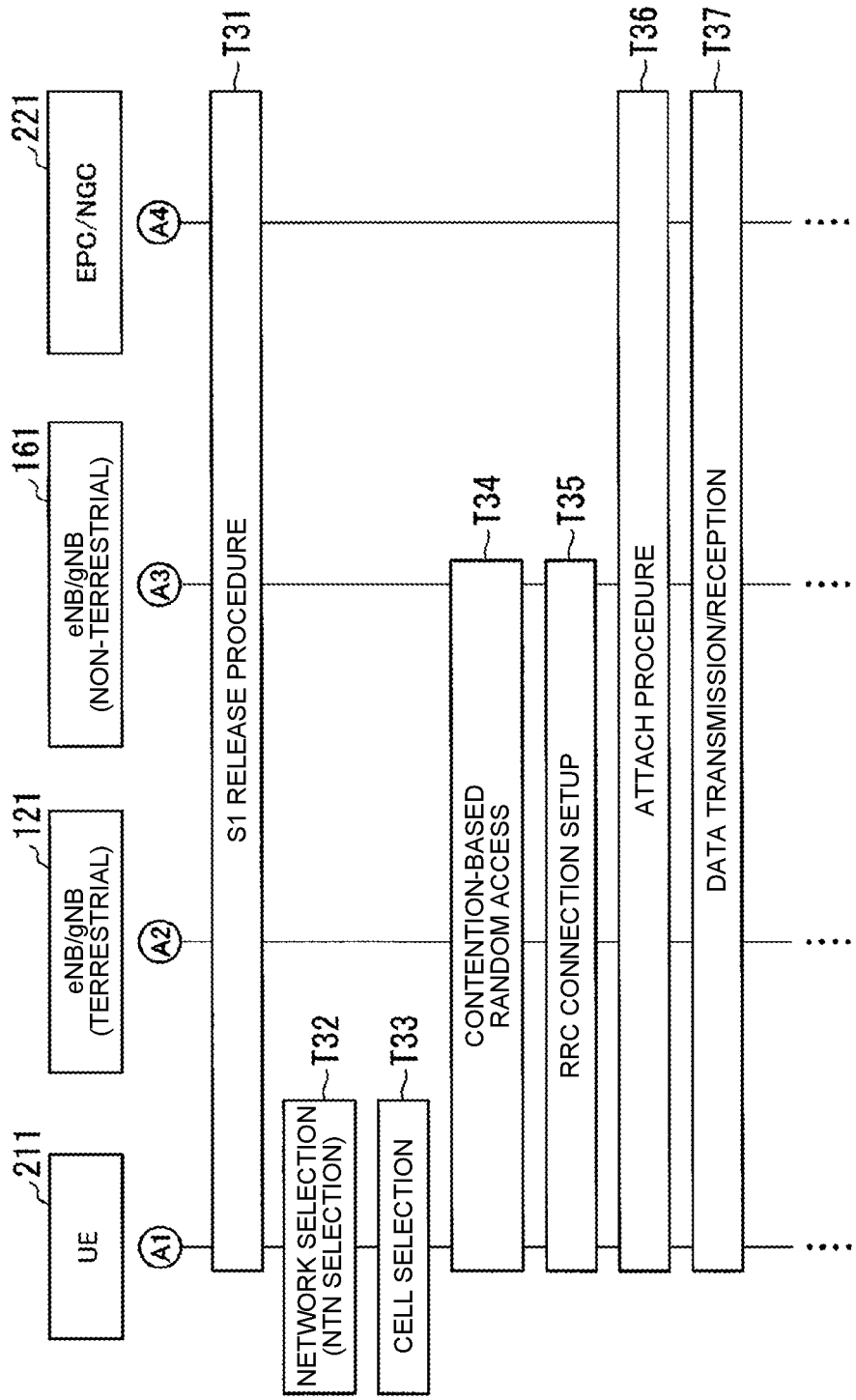
FIG. 8 is a diagram illustrating an example of processes performed after power is turned on in the non-terrestrial radio communication device according to the embodiment of the present disclosure.

FIGS. 7 and 8 are diagrams illustrating an example of processes performed after power is turned on in a non-terrestrial radio communication device 211 according to the embodiment of the present disclosure. The non-terrestrial radio communication device 211 is an example of the non-terrestrial radio communication device 101-1 illustrated in FIG. 6.

FIGS. 7 and 8 illustrate specific examples of processes performed in the non-terrestrial radio communication device 211 (UE in the figure), the terrestrial base station device 121 (eNB/gNB (terrestrial) in the figure), the non-terrestrial base station device 161 (eNB/gNB (non-terrestrial) in the figure), and a core 221 (EPC/NGC in the figure). Note that the EPC represents an Evolved Packet Core, and the NGC represents a Next Generation Core. In addition, NGC may also be referred to as a 5G Core (5GC).

First, processes T11 to T20 illustrated in FIG. 7 will be described.

The non-terrestrial radio communication device 211 first performs altitude measurement (process T11). In the present example, the non-terrestrial radio communication device 211 is assumed to exist on the ground immediately after the power is turned on.

In this case, the non-terrestrial radio communication device 211 detects that the measured altitude is a predetermined threshold or less (process T12).

Next, the non-terrestrial radio communication device 211 executes a PLMN selection process as a network selection process (process T13).

Next, the non-terrestrial radio communication device 211 executes a cell selection process for selecting an optimal cell to be camped on from among cells belonging to the selected PLMN ID (process T14).

Next, the non-terrestrial radio communication device 211 executes a random access process on the terrestrial base station device 121 selected in the cell selection process (process T15). Incidentally, the process is a contention-based random access process.

Thereafter, the non-terrestrial radio communication device 211 starts RRC connection setup (process T16).

Next, the non-terrestrial radio communication device 211 performs a process of an Attach procedure on the core 221 (process T17). With this process, the non-terrestrial radio communication device 211 performs position registration (registration) in a mobility management entity (MME) or an access and mobility management function (AMF).

At this stage, the non-terrestrial radio communication device 211 transitions to a connected mode, and can perform transmission (data transmission) and reception (data reception) of user plane (U-plane) data via a packet data network server (PDN server) or a data network (DN) (process T18).

The non-terrestrial radio communication device 211 measures an altitude at a fixed cycle or a variable cycle, for example (process T19).

The present example describes a case where the non-terrestrial radio communication device 211 has detected that the altitude exceeds a predetermined threshold (process T20).

Next, processes T31 to T37 illustrated in FIG. 8 will be described.

In a case where it is detected in the process T20 that the altitude exceeds a predetermined threshold, the non-terrestrial radio communication device 211 starts a process of a procedure of S1 release with the core 221 (process T31). In this procedure, the non-terrestrial radio communication device 211 disconnects the connection to the network.

Next, the non-terrestrial radio communication device 211 executes an NTN selection process as a network selection process (process T32).

Next, the non-terrestrial radio communication device 211 executes a cell selection process for selecting an optimal cell to be camped on from among cells belonging to the selected NTN ID (process T33).

Next, the non-terrestrial radio communication device 211 executes a random access process on the non-terrestrial base station device 161 (for example, gNB in the present example) selected in the cell selection process (process T34). Note that the process is contention-based random access processing.

Thereafter, the non-terrestrial radio communication device 211 starts RRC connection setup with the non-terrestrial base station device 161 (process T35).

Next, the non-terrestrial radio communication device 211 performs a process of an Attach procedure on the core 221 (in the present example, an NGC, for example) (process T36). As a result, the non-terrestrial radio communication device 211 performs position registration in the AMF.

At this stage, the non-terrestrial radio communication device 211 can transition to the connected mode so as to enable data transmission and reception via the PDN server or the DN (process T37).

Thereafter, similarly to the above, the non-terrestrial radio communication device 211 can appropriately select a TN or an NTN with a process according to the altitude.

Here, an example other than the examples illustrated in FIGS. 7 and 8 will be described.

Figure 9:
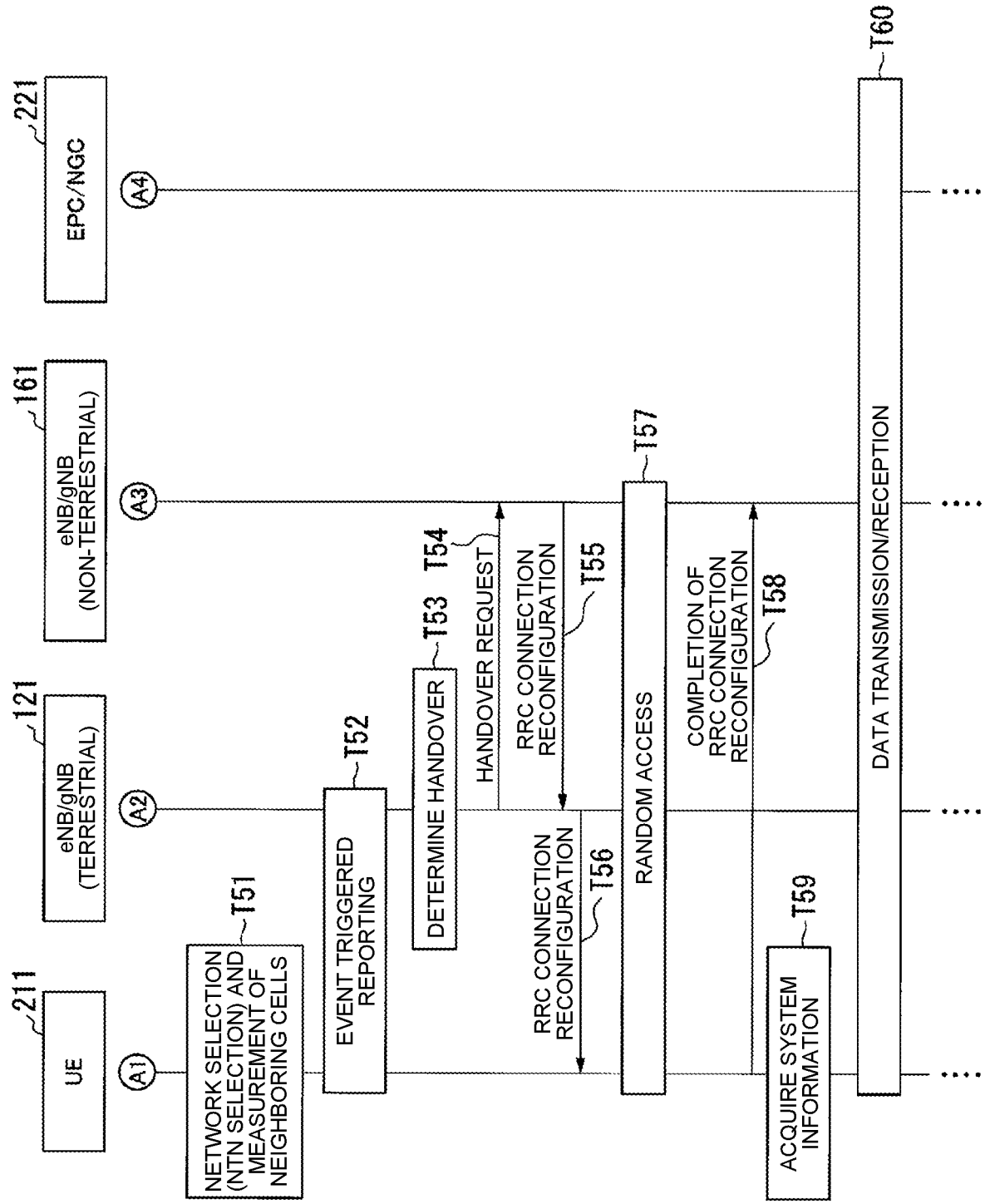
FIG. 9 is a diagram illustrating another example of processes performed after power is turned on in the non-terrestrial radio communication device according to the embodiment of the present disclosure.

In the present example, the processes similar to the processes T11 to T20 illustrated in FIG. 7 will be executed, and processes T51 to T60 illustrated in FIG. 9 will be executed as the processes subsequent to the process T20. That is, in the present example, the processes illustrated in FIG. 9 are executed instead of the processes illustrated in FIG. 8.

FIG. 9 is a diagram illustrating another example of the processes performed after power is turned on in the non-terrestrial radio communication device 211 according to the embodiment of the present disclosure.

The examples illustrated in FIGS. 7 and 8 are cases where the connection is temporarily disconnected when the base station device to which the non-terrestrial radio communication device 211 is connected is switched from the terrestrial base station device 121 to the non-terrestrial base station device 161.

In contrast, the examples of FIGS. 7 and 9 are cases where the base station device connected to the non-terrestrial radio communication device 211 is switched based on handover.

Processes T51 to T60 illustrated in FIG. 9 will be described.

In a case where it is detected in the process T20 that the altitude exceeds a predetermined threshold, the non-terrestrial radio communication device 211 performs the NTN selection process and the radio wave measurement of the neighboring cell as the network selection process (process T51). In this case, the non-terrestrial radio communication device 211 measures the reception strength of the radio wave from the optimal non-terrestrial base station device 161 belonging to the NTN ID holding the subscription of the non-terrestrial radio communication device 211 from among the neighboring cells as candidate cells.

When the altitude and the reception strength from the non-terrestrial base station device 161 (for example, gNB in the present example) satisfy a preset condition of a certain event, the non-terrestrial radio communication device 211 starts a process of event triggered reporting including reporting of information regarding the altitude onto the terrestrial base station device 121 (process T52).

Next, based on a measurement report received from the non-terrestrial radio communication device 211, the terrestrial base station device 121 determines execution of handover to the non-terrestrial base station device 161 (process T53).

Next, the terrestrial base station device 121 issues a handover request to the non-terrestrial base station device 161 as a target of handover specified based on the measurement report (process T54).

The non-terrestrial base station device 161 responds to the terrestrial base station device 121 with an RRC connection reconfiguration (process T55).

Next, the terrestrial base station device 121 transfers the RRC connection reconfiguration to the non-terrestrial radio communication device 211 (process T56).

Next, the non-terrestrial radio communication device 211 executes a random access process on the non-terrestrial base station device 161 (process T57).

Next, after having received a Random Access Response or UE Contention Resolution Identity from the non-terrestrial base station device 161, the non-terrestrial radio communication device 211 transmits RRC Connection Reconfiguration Complete to the non-terrestrial base station device 161 (process T58).

Next, the non-terrestrial radio communication device 211 receives and acquires system information of the non-terrestrial base station device 161 (process T59).

The non-terrestrial radio communication device 211 then continuously performs transmission and reception of the user plane data with the PDN server or the DN via the non-terrestrial base station device 161 (process T60).

Note that, the example of FIG. 9 is a case where X2/Xn-based handover is performed in a case where an X2/Xn interface is provided between the terrestrial base station device 121 and the non-terrestrial base station device 161.

In a case where the radio communication system 100 has no X2/Xn interface, S1/NG based handover may be executed, for example. In the S1/NG based handover, a message exchanged between the terrestrial base station device 121 and the non-terrestrial base station device 161 is exchanged via the MME or the AMF.

Figure 10:
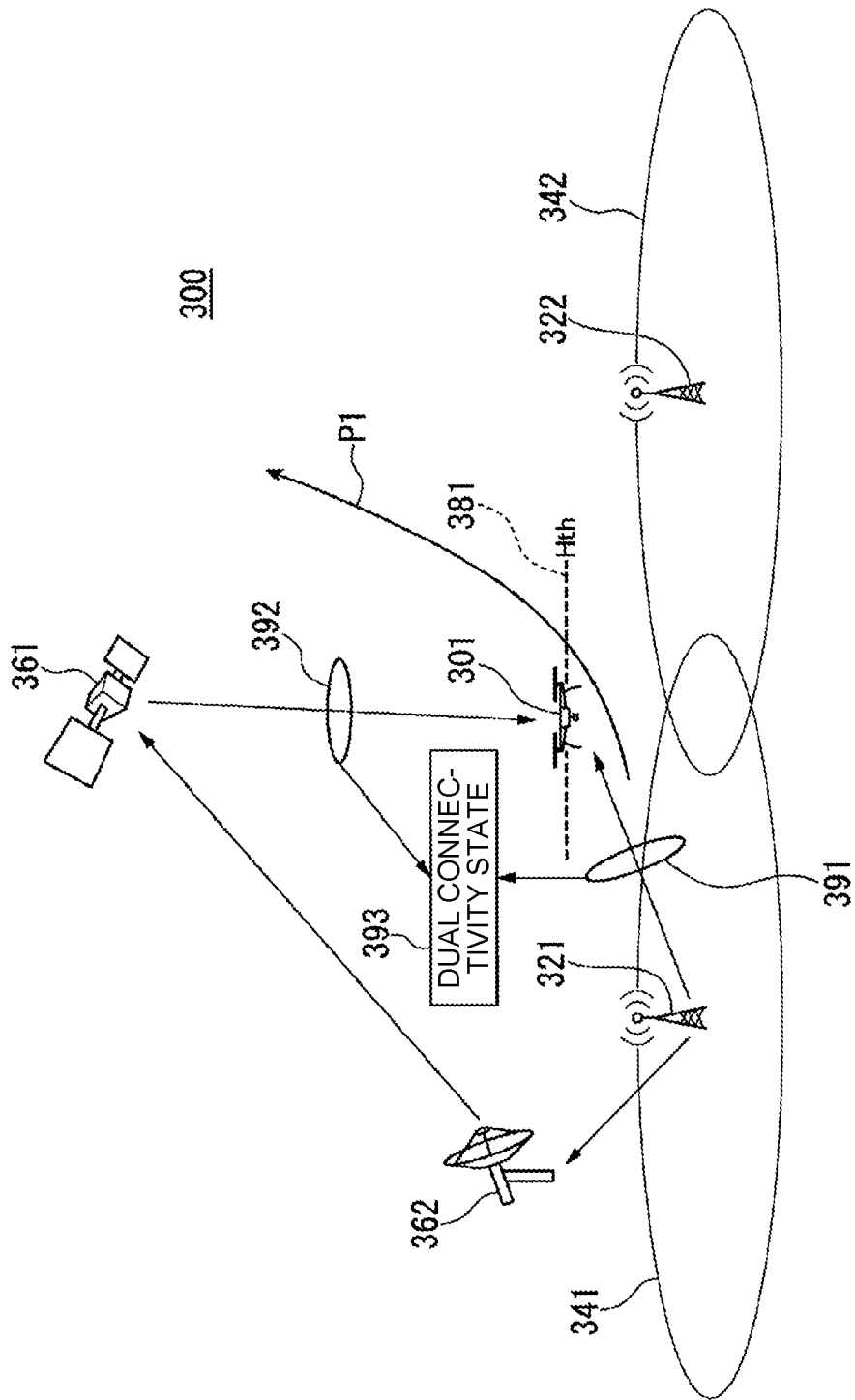
FIG. 10 is a diagram illustrating an example of mobility management regarding a non-terrestrial radio communication device in a case where a terrestrial base station device according to the embodiment of the present disclosure has an X2/Xn interface with a non-terrestrial base station device.
Figure 11:
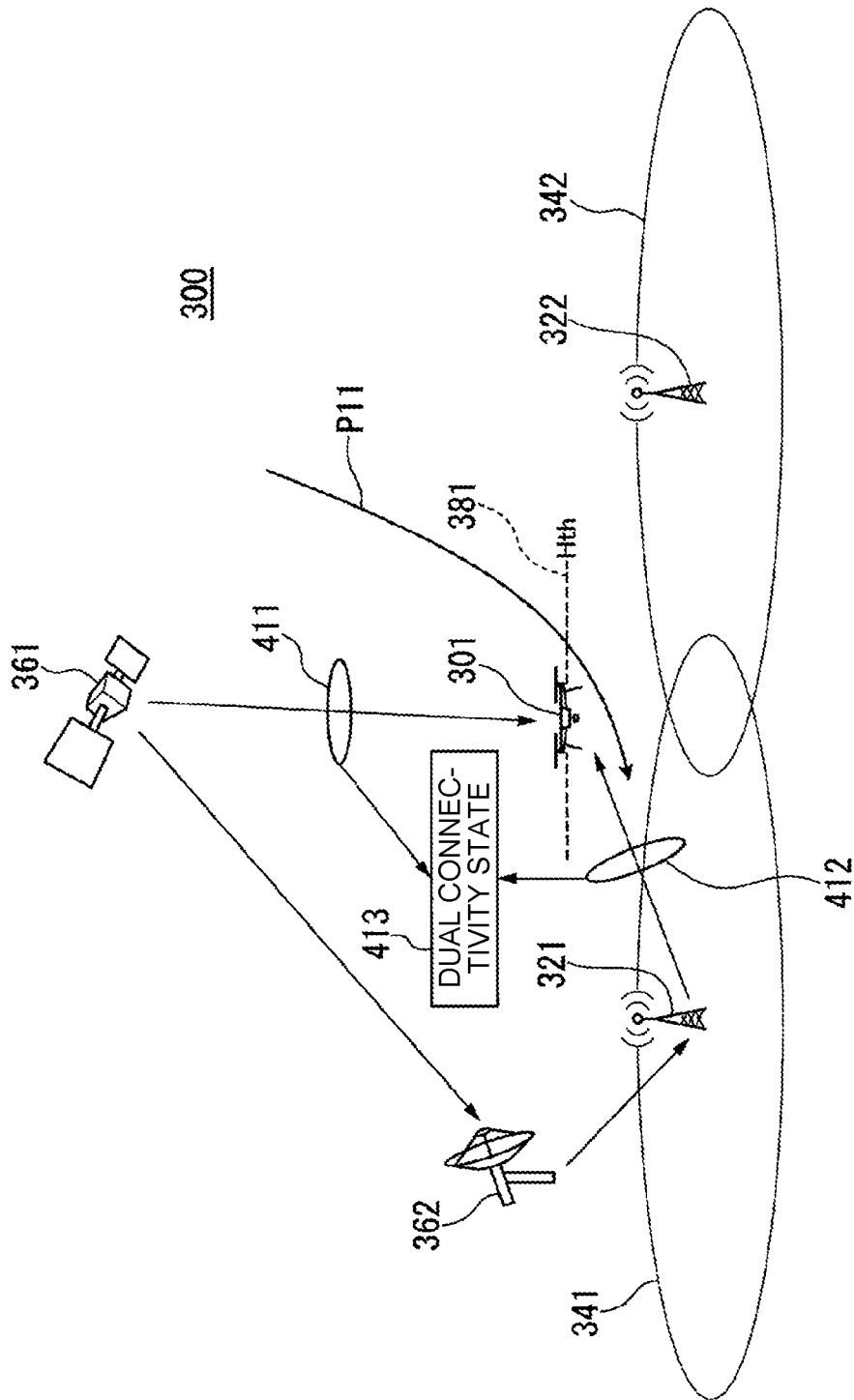
FIG. 11 is a diagram illustrating an example of mobility management regarding a non-terrestrial radio communication device in a case where the terrestrial base station device according to the embodiment of the present disclosure has an X2/Xn interface with a non-terrestrial base station device.

FIGS. 10 and 11 are diagrams illustrating an example of mobility management regarding a non-terrestrial radio communication device 301 in a case where terrestrial base station devices 321 to 322 have the X2/Xn interface with a non-terrestrial base station device 361 according to the embodiment of the present disclosure.

FIGS. 10 and 11 illustrate a configuration example of a radio communication system 300 including: the non-terrestrial radio communication device 301 which is a drone, for example; the TN base station device 321 which is an eNB or a gNB and a cell 341 of the TN base station device 321; the TN base station device 322 which is an eNB or a gNB and a cell 342 of the TN base station device 322; the NTN base station device 361 mounted on an artificial satellite; and a relay station device 362 installed on the ground.

Here, in the present example, the relay station device 362 relays radio communication between the TN base station device 321 and the NTN base station device 361.

FIGS. 10 and 11 schematically illustrate a threshold altitude 381 corresponding to the threshold Hth of the altitude.

Here, the radio communication system 300 illustrated in FIGS. 10 and 11 is an example of the radio communication system 100 illustrated in FIG. 6.

In the present example, the non-terrestrial radio communication device 301, the TN base station device 321 and its cell 341, the TN base station device 322 and its cell 342, and the NTN base station device 361 mounted on an artificial satellite, which are illustrated in FIGS. 10 and 11, correspond to the non-terrestrial radio communication device 101-1, the TN base station device 121 and its cell 141, the TN base station device 122 and its cell 142, and the NTN base station device 161 mounted on an artificial satellite, which are illustrated in FIG. 6, respectively.

For example, the NTN base station device 361 (for example, gNB in the present example) has an X2/Xn interface with the TN base station device 321 via the relay station device 362. The relay station device 362 and the TN base station device 321 may be connected to each other via a wired channel such as an optical fiber, for example. Furthermore, the TN base station device 321 and the NTN base station device 361 may be connected by wireless (radio) communication by using a technology referred to as integrated access and backhaul (IAB) in which the TN base station device 321 operates as a donor node and the relay station device 362 operates as a relay node.

The non-terrestrial radio communication device 301 executes the processes of the flow illustrated in FIG. 3, for example, leading to the switching of the connection destination from the TN base station device 321 to the NTN base station device 361, or switching of the connection destination from the NTN base station device 361 to the TN base station device 321. In the present example, at the time of such switching, dual connectivity is established, and zero (0) ms interruption handover is realized.

First, an example of FIG. 10 will be described.

In the example of FIG. 10, with a movement from the ground to the air in a moving direction P1, the non-terrestrial radio communication device 301 moves from a position at an altitude being the threshold altitude 381 or less to a position at an altitude exceeding the threshold altitude 381.

In the present example, the connection destination of the non-terrestrial radio communication device 301 is switched from the TN base station device 321 to the NTN base station device 361. In this case, the non-terrestrial radio communication device 301 transmits/receives identical information by using an access link 391 defining the TN base station device 321 as an anchor node and an access link 392 of the NTN base station device 361 via the relay station device 362. With this configuration, the radio communication system 300 can implement a dual connectivity state 393, making it possible to improve the robustness against the interruption due to handover.

In the present example, the NTN base station device 361, as a secondary gNB, processes a protocol stack of the radio link layer (RLC) or lower layers.

In addition, a Packet Data Convergence Protocol (PDCP) layer of the TN base station device 321, which is a master eNB or a master gNB, processes packets transmitted and received by the NTN base station device 361 and the TN base station device 321.

Next, an example of FIG. 11 will be described.

In the example of FIG. 11, with a movement from the air to the ground in a moving direction P11, the non-terrestrial radio communication device 301 moves from a position at an altitude exceeding the threshold altitude 381 to a position at an altitude being the threshold altitude 381 or less.

In the present example, the connection destination of the non-terrestrial radio communication device 301 is switched from the NTN base station device 361 to the TN base station device 321. In this case, the non-terrestrial radio communication device 301 transmits/receives identical information by using an access link 411 via the relay station device 362 defining the NTN base station device 361 as an anchor node and an access link 412 via the TN base station device 321. With this configuration, the radio communication system 300 can implement a dual connectivity state 413, making it possible to improve the robustness against the interruption due to handover.

In the present example, the TN base station device 321, as a secondary eNB or a secondary gNB, processes the protocol stack of the RLC or lower layers.

In addition, the PDCP layer of the NTN base station device 361 being the master gNB processes packets transmitted and received by the TN base station device 321 and the NTN base station device 361.

[Other Examples of Subject of Determination in Radio Communication Device]

Here, in the present embodiment, the radio communication device 11 performs various determinations using various types of information. Alternatively however, as another example, one or more determination processes may be performed by a determination device other than the radio communication device 11. For example, the determination device may perform predetermined determination and transmit information indicating a result of the determination to the radio communication device 11. The information necessary for the determination may be stored in advance in the determination device, or may be transmitted from the radio communication device 11 to the determination device, for example. The determination device may be a server device, for example.

Note that the determination includes, for example, determination of a magnitude relationship between altitude and a threshold.

[Example of Configuration and Effect of Embodiment]

As described above, in the radio communication device 11 in the radio communication system according to the present embodiment, the measurement unit 33 measures the value specifying the altitude. Subsequently, based on the measured value, the altitude determination unit 55 determines whether to connect to a terrestrial network (TN) or to a non-terrestrial network (NTN).

Therefore, the radio communication device 11 can select an appropriate network out of the terrestrial network and the non-terrestrial network as the network as a connection destination based on the altitude information specified by the measurement.

Furthermore, in the radio communication device 11 in the radio communication system according to the present embodiment, the altitude determination unit 55 determines whether to connect to the terrestrial network or to the non-terrestrial network based on a threshold related to the altitude and the measured value.

Accordingly, the radio communication device 11 can perform accurate determination using the threshold related to the altitude.

Furthermore, in the radio communication device 11 in the radio communication system according to the present embodiment, the threshold setting unit 54 sets a threshold (threshold related to the altitude) based on information notified from the base station device.

Accordingly, the radio communication device 11 is capable of appropriately setting the threshold related to the altitude. Furthermore, the radio communication device 11 is capable of changing the threshold related to the altitude according to the communication status and the like.

Furthermore, in the radio communication device 11 in the radio communication system according to the present embodiment, the threshold (threshold related to the altitude) is a value larger than zero (0).

Therefore, the radio communication device 11 is capable of using different connection destination networks depending on whether the position is high or low even in the air. With this configuration, the radio communication device 11 can connect to an appropriate network according to a communication environment, for example.

Furthermore, in the radio communication device 11 in the radio communication system according to the present embodiment, the selection execution unit selects a network. In this case, the selection execution unit selects a terrestrial network when the altitude determination unit 55 has determined to connect to a terrestrial network, and selects a non-terrestrial network when the altitude determination unit 55 has determined to connect to a non-terrestrial network.

Accordingly, the radio communication device 11 is capable of selecting an appropriate network.

Furthermore, in the radio communication system according to the present embodiment, in a case where a terrestrial network is selected, the selection execution unit 52 of the radio communication device 11 determines whether the radio communication device 11 exists inside or outside the range of the terrestrial network base station device. Subsequently, in a case where the radio communication device 11 has been determined to exist outside the range of the terrestrial network base station device, the selection execution unit 52 selects a non-terrestrial network.

Therefore, in a case where connection to a terrestrial network is estimated but the connection to the terrestrial network would be difficult, the radio communication device 11 can utilize a non-terrestrial network to achieve communication by connecting to the non-terrestrial network.

Furthermore, in the radio communication device 11 in the radio communication system according to the present embodiment, when selecting a terrestrial network, the selection execution unit 52 selects one network from among one or more networks to each of which identification information of the terrestrial network is allocated.

Therefore, the radio communication device 11 can appropriately select the network based on the identification information of the network.

Furthermore, in the radio communication device 11 in the radio communication system according to the present embodiment, when selecting a non-terrestrial network, the selection execution unit 52 selects one network from among one or more networks to each of which identification information of the non-terrestrial network is allocated.

Therefore, the radio communication device 11 can appropriately select the network based on the identification information of the network.

Furthermore, in the radio communication device 11 in the radio communication system according to the present embodiment, the selection execution unit 52 selects one network based on the priority that has been set for two or more networks to each of which identification information of the non-terrestrial network is allocated.

Therefore, even in a case where there are two or more networks to each of which the identification information of the non-terrestrial network is allocated, the radio communication device 11 can appropriately select a network based on the priority.

Furthermore, in the radio communication device 11 in the radio communication system according to the present embodiment, the type determination unit 51 determines whether the type is the terrestrial type or the non-terrestrial type. When the type determination unit 51 has performed determination of the non-terrestrial type, the measurement unit 33 measures a value (value specifying the altitude).

Therefore, in a case where the non-terrestrial type is set, the radio communication device 11 can execute a network connection process using an altitude measurement result.

Furthermore, in the radio communication device 11 in the radio communication system according to the present embodiment, the type determination unit 51 determines the type based on subscription information.

Accordingly, the radio communication device 11 can determine the type according to the details of the subscription related to the radio communication device 11.

Furthermore, in the radio communication device 11 in the radio communication system according to the present embodiment, the non-terrestrial network is a network utilizing an artificial satellite belonging to a low Earth orbit, a medium Earth orbit, a geostationary Earth orbit, or a highly elliptical orbit, or utilizing a high altitude platform including an unmanned aircraft system.

Accordingly, the radio communication device 11 is capable of use a variety of networks as the non-terrestrial network.

Furthermore, in a radio communication method according to the present embodiment, the radio communication device 11 measures a value specifying the altitude, and determines whether to connect to a terrestrial network or a non-terrestrial network based on the measured value.

Therefore, by using the radio communication method, it is possible, in the radio communication device 11, to select an appropriate network out of the terrestrial network and the non-terrestrial network as the network as a connection destination based on the altitude information specified by the measurement.

Furthermore, a program according to the present embodiment is a program that is configured with an instruction written in a computer language for the purpose of expressing a data structure and that is provided to cause a computer system to execute processes for connecting to a network. The program acquires a result of measuring a value specifying the altitude, and determines whether to connect to a terrestrial network or a non-terrestrial network based on the acquired value.

Therefore, by using the program, it is possible, in the radio communication device 11, to select an appropriate network out of the terrestrial network and the non-terrestrial network as the network as a connection destination based on the altitude information specified by the measurement.

Furthermore, the radio communication system according to the present embodiment includes the radio communication device 11, a terrestrial network, and a non-terrestrial network. In the radio communication device 11, the measurement unit 33 measures a value specifying the altitude. Subsequently, based on the measured value, the altitude determination unit 55 determines whether to connect to the terrestrial network or to the non-terrestrial network.

Therefore, by using the radio communication system, it is possible, in the radio communication device 11, to select an appropriate network out of the terrestrial network and the non-terrestrial network as the network as a connection destination based on the altitude information specified by the measurement.

As described above, with the radio communication device 11, the radio communication method, the program, and the radio communication system according to the present embodiment, it is possible to select an appropriate network from among the terrestrial network and the non-terrestrial network as the network as a connection destination appropriate for the situation.

[Description of Technology of UAV and the Like]

In order to provide a means of radio communication for an UAV represented by a drone or aerial UE, 3GPP Rel-15 conducted an extension for accommodating the UAV or aerial UE in a cellular network, which is a TN optimized for terrestrial radio communication devices.

For example, there is a review that it is possible, in an UAV or Aerial UE, to observe more neighboring cells than in a terrestrial radio communication device existing on the ground. That is, a UAV or an aerial UE under a line-of-sight (LOS) environment can observe even a cell located farther as compared with a terrestrial radio communication device. For this reason, regarding the UAV or the aerial UE, it would be also possible, in the mobility management, to perform an operation of maintaining the connection to the farthest possible cells so as to reduce the occurrence frequency of handover. However, there can be a concern in this case that a signal transmitted from the UAV or the aerial UE would interfere with many base station devices, affecting communication between the base station device and the terrestrial radio communication device.

In addition, the position of the radio communication device in the idle mode is managed on the network side simply in units of TA. This is because paging for calling the radio communication device in the idle mode is performed in units of TA and thus it is sufficient to perform mobility management within the range of TA.

Expanding the range of TA would make it possible to decrease the occurrence frequency of TA update performed each time TA changes due to the movement of the radio communication device, leading to the reduction of the power consumption at the time of standby. On the other hand, in this case, paging needs to be performed from all base station devices belonging to an identical TA in order to call one radio communication device, resulting in an increase of radio resource consumption.

That is, the range setting for such TA is performed in a trade-off relationship between the power consumption at the time of standby and the overhead of the radio resource necessary for paging.

Here, it is difficult, on the network side, to grasp the accurate position of the radio communication device in the idle mode. For this reason, for example, it has been difficult, when the random access started at the time of TA update or the initial access is performed in relation to the UAV or the aerial UE, to perform processes of reducing the transmission output of the UAV or the aerial UE by controlling the directivity of the antenna on the base station device side toward the UAV or the aerial UE. This has made it difficult to reduce interference of a signal in radio wave transmitted in radio communication from the UAV or the aerial UE to neighboring cells.

On the other hand, in 3GPP Rel-16, also a concept regarding NTN is under discussion in which an artificial satellite or a high altitude platform provides 5G services.

With this background, in a case where a radio communication service is provided to the UAV or the aerial UE, it is considered desirable to construct a mechanism that effectively utilizes the NTN appropriately for the situation, rather than always utilizing only the TN, which is not a network optimized for the UAV or the aerial UE in the air.

Therefore, the technology according to the present disclosure will be effective.

[Configuration Example of Program Providing Medium]

A program providing medium that provides a program to cause a computer system to execute processes for connecting to a network, in a computer readable format, in which the program acquires a result of measuring a value specifying an altitude, and determines whether to connect to a terrestrial network or a non-terrestrial network based on the acquired value.

Note that the program providing medium may be referred to as a program recording medium that records a program.

OTHER CONFIGURATION EXAMPLES

[A1]

A radio communication device including:
a type determination unit that determines whether a type is a terrestrial type or a non-terrestrial type;
a selection execution unit that selects a terrestrial network when the type determination unit has determined the type as the terrestrial type, and selects a non-terrestrial network when the type determination unit has determined the type as the non-terrestrial type.

Accordingly, the radio communication device can select an appropriate network out of a terrestrial network and a non-terrestrial network as a network as a connection destination based on the type information regarding the radio communication device.

[A2]

A radio communication device including:
a type determination unit that determines whether a type is a terrestrial type or a non-terrestrial type; and
a selection execution unit that selects a terrestrial network when the type has been determined as the terrestrial type by the type determination unit,
in which the selection execution unit determines whether the radio communication device exists inside or outside a range of the terrestrial network, and selects a network other than the terrestrial network when the device has been determined to exist outside the range.

Accordingly, even when the type of the radio communication device is the terrestrial type, the radio communication device can utilize a network other than the terrestrial network when the radio communication device is outside the range of the terrestrial network.

[A3]

The radio communication device according to [A2],
in which the network other than the terrestrial network is a non-terrestrial network.

Accordingly, the radio communication device is capable of utilizing the non-terrestrial network as a network other than the terrestrial network.

[Regarding Above Embodiment]

Note that the program for actualizing the function of a certain component in a certain device described above may be recorded in a computer-readable recording medium, and the program may be loaded on and executed by a computer system. Note that the "computer system" here includes an operating system (OS) or hardware such as a peripheral device. Furthermore, the "computer-readable recording medium" refers to a storage device including a portable medium such as a flexible disk, a magneto-optical disk, ROM, and compact disc (CD)-ROM, or a hard disk built in a computer system. Furthermore, the "computer-readable recording medium" includes a medium that holds a program for a certain period of time, such as volatile memory (RAM) inside a computer system that functions as a server or a client when the program is transmitted via a network such as the Internet or a communication channel such as a telephone channel.

In addition, the program may be transmitted from a computer system in which the program is stored in a storage device or the like to another computer system via a transmission medium or by a transmission wave in the transmission medium. Here, the "transmission medium" that transmits a program refers to a medium having a function of transmitting information, such as a network such as the Internet or a communication channel such as a telephone channel.

In addition, the program may be provided to implement a part of the functions described above. Furthermore, the above-described program may be a program that can implement the above-described functions in combination with a program already recorded in the computer system, that is, a program also referred to as a difference file. The difference file may be referred to as a difference program.

The function of the certain component in the certain device described above may be implemented by a processor. For example, each of processes in the present embodiment may be implemented by a processor that operates based on information such as a program and by a computer-readable recording medium that stores the information such as a program. Here, the processor may have a configuration in which the functions of individual components are implemented by separate pieces of hardware or the functions of individual components are implemented by one integrated piece of hardware. For example, the processor may include hardware, and the hardware may include at least one of a circuit that processes a digital signal or a circuit that processes an analog signal. For example, the processor may be configured using one or both of: one or more circuit devices or one or more circuit elements, mounted on a circuit board. Examples of an applicable circuit device include an integrated circuit (IC), and examples of an applicable circuit element include a resistor and a capacitor.

Here, the processor may be a CPU, for example. However, the processor is not limited to the CPU, and may be implemented by using various processors such as a graphics processing unit (GPU) or a digital signal processor (DSP). Furthermore, the processor may be a hardware circuit using an application specific integrated circuit (ASIC), for example. Furthermore, the processor may be formed with a plurality of CPUs or with a hardware circuit including a plurality of ASICs, for example. Furthermore, the processor may be formed with a combination of a plurality of CPUs and a hardware circuit including a plurality of ASICs, for example. Furthermore, the processor may include one or more of an amplifier circuit, a filter circuit, or the like, used to process an analog signal.

Although the embodiment of the present disclosure has been described in detail with reference to the drawings, the specific configuration is not limited to this embodiment, and includes a design and the like within a range not departing from the scope and spirit of the present disclosure.

The effects described in the present specification are merely examples, and thus, there may be other effects, not limited to the exemplified effects.

Note that the following configurations also belong to the technical scope of the present disclosure.

(1)
A radio communication device comprising:
a measurement unit that measures a value specifying an altitude; and
an altitude determination unit that determines whether to connect to a terrestrial network or a non-terrestrial network based on the value measured by the measurement unit.

(2)
The radio communication device according to (1),
wherein the altitude determination unit determines whether to connect to a terrestrial network or to a non-terrestrial network based on a threshold related to the altitude and the value measured by the measurement unit.

(3)
The radio communication device according to (2), further comprising
a threshold setting unit that sets the threshold based on information notified from a base station device.

(4)
The radio communication device according to (2) or (3),
wherein the threshold is a value larger than zero (0).

(5)
The radio communication device according to any one of (1) to (4), further comprising
a selection execution unit that selects a network,
wherein the selection execution unit selects the terrestrial network when the altitude determination unit has determined to connect to the terrestrial network, and selects the non-terrestrial network when the altitude determination unit has determined to connect to the non-terrestrial network.

(6)
The radio communication device according to (5),
wherein, when the terrestrial network is selected, the selection execution unit determines whether the device is located inside or outside a range of a base station device of the terrestrial network, and
when the device has been determined to exist outside the range of the base station device of the terrestrial network, the selection execution unit selects the non-terrestrial network.

(7)
The radio communication device according to (6),
wherein, when selecting the terrestrial network, the selection execution unit selects one network from among one or more networks to each of which identification information of the terrestrial network is allocated.

(8)
The radio communication device according to (6) or (7),
wherein, when selecting the non-terrestrial network, the selection execution unit selects one network from among one or more networks to each of which identification information of the non-terrestrial network is allocated.

(9)
The radio communication device according to (8),
wherein the selection execution unit selects the one network based on a priority set for two or more networks to each of which the identification information of the non-terrestrial network is allocated.

(10)
The radio communication device according to any one of (1) to (9), further comprising
a type determination unit that determines whether a type is a terrestrial type or a non-terrestrial type,
wherein the measurement unit measures the value when the type determination unit has determined the type as the non-terrestrial type.

(11)
The radio communication device according to (10),
wherein the type determination unit determines the type based on subscription information.

(12)
The radio communication device according to any one of (1) to (11),
wherein the non-terrestrial network is a network utilizing an artificial satellite belonging to a low Earth orbit, a medium Earth orbit, a geostationary Earth orbit, or a highly elliptical orbit, or utilizing a high altitude platform including an unmanned aircraft system.

(13)
A radio communication method comprising:
measuring, by a radio communication device, a value specifying altitude; and
determining, by the radio communication device, whether to connect to a terrestrial network or a non-terrestrial network based on the measured value.

(14)
A program provided to cause a computer system to execute processes for connecting to a network,
the program being configured to acquire a result of measuring a value specifying an altitude and to determine whether to connect to a terrestrial network or a non-terrestrial network based on the acquired value.

(15)
A radio communication system, comprising:
a radio communication device; a terrestrial network; and
a non-terrestrial network, wherein the radio communication device includes:
a measurement unit that measures a value specifying an altitude; and
an altitude determination unit that determines whether to connect to the terrestrial network or connect to the non-terrestrial network based on the value measured by the measurement unit.

REFERENCE SIGNS LIST

11 RADIO COMMUNICATION DEVICE
31 OPERATION UNIT
32 OUTPUT UNIT
33 MEASUREMENT UNIT
34 COMMUNICATION UNIT
35 STORAGE UNIT
36 CONTROL UNIT
51 TYPE DETERMINATION UNIT
52 SELECTION EXECUTION UNIT
53 INFORMATION ACQUISITION UNIT
54 THRESHOLD SETTING UNIT
55 ALTITUDE DETERMINATION UNIT
100, 300 RADIO COMMUNICATION SYSTEM
101-1, 101-2, 101-3, 301 NON-TERRESTRIAL RADIO COMMUNICATION DEVICE
121 to 122, 321 to 322 TERRESTRIAL BASE STATION DEVICE
141 to 142, 341 to 342 CELL
161, 361 NON-TERRESTRIAL BASE STATION DEVICE
181, 381 THRESHOLD ALTITUDE
362 RELAY STATION DEVICE
391 to 392, 411 to 412 ACCESS LINK
393, 413 DUAL CONNECTIVITY STATE
P1, P11 MOVING DIRECTION

The invention claimed is:

1. A radio communication device, comprising:
circuitry configured to:
measure a value that specifies an altitude;
determine whether to select one of a terrestrial network or a non-terrestrial network, wherein the determination is based on the measured value; and
measure one of cells or beams that belong to the non-terrestrial network in a case where the non-terrestrial network is selected.

2. The radio communication device according to claim 1, wherein the determination is further based on a threshold related to the altitude and the measured value.

3. The radio communication device according to claim 2, wherein the circuitry is further configured to set the threshold based on a location of the radio communication device.

4. The radio communication device according to claim 2, wherein the circuitry is further configured to set the threshold based on a location of a base station device.

5. The radio communication device according to claim 2, wherein the circuitry is further configured to set the threshold based on a frequency band.

6. The radio communication device according to claim 2, wherein the circuitry is further configured to set the threshold based on information notified from a base station device.

7. The radio communication device according to claim 2, wherein the threshold is larger than zero.

8. The radio communication device according to claim 1, wherein the circuitry is further configured to:
in a case where the terrestrial network is selected, measure one of cells or beams that belong to the terrestrial network;
determine whether the radio communication device is located one of inside or outside a range of a base station device of the terrestrial network; and
in a case where the radio communication device has been determined to exist outside the range of the base station device of the terrestrial network, select the non-terrestrial network.

9. The radio communication device according to claim 8, wherein, in a case where the terrestrial network is selected, the circuitry is further configured to select one network from a plurality of networks to each of which identification information of the terrestrial network is allocated.

10. The radio communication device according to claim 8, wherein, in a case where the non-terrestrial network is selected, the circuitry is further configured to select one network from a plurality of networks to each of which identification information of the non-terrestrial network is allocated.

11. The radio communication device according to claim 10, wherein the circuitry is further configured to select the one network based on a priority set for the plurality of networks.

12. The radio communication device according to claim 1, wherein the circuitry is further configured to:
determine whether a type of the radio communication device includes one of a terrestrial type or a non-terrestrial type; and
measure the value in a case where the type is determined as the non-terrestrial type.

13. The radio communication device according to claim 12, wherein the circuitry is further configured to determine the type based on subscription information.

14. The radio communication device according to claim 1, wherein the non-terrestrial network includes a network that utilizes:
an artificial satellite belonging to one of a low Earth orbit, a medium Earth orbit, a geostationary Earth orbit, or a highly elliptical orbit, or
a high altitude platform including an unmanned aircraft system.

15. The radio communication device according to claim 14, wherein the network that utilizes the artificial satellite or the high altitude platform is identified with identification information.

16. The radio communication device according to claim 15, wherein
the identification information includes priority, and
the circuitry is further configured to select the network with the identification information based on the priority in a case where the non-terrestrial network is selected.

17. A radio communication method, comprising:
measuring, by a radio communication device, a value that specifies altitude;
determining, by the radio communication device, whether to select one of a terrestrial network or a non-terrestrial network, wherein the determination is based on the measured value; and
measuring one of cells or beams that belong to the non-terrestrial network in a case where the non-terrestrial network is selected.

18. A non-transitory computer-readable medium having stored thereon, computer-executable instructions that when executed by an electronic device, causes the electronic device to execute operations, the operations comprising
acquiring a result of measuring a value that specifies an altitude;

determining whether to select one of a terrestrial network or a non-terrestrial network, wherein the determination is based on the measured value; and measuring one of cells or beams that belong to the non-terrestrial network in a case where the non-terrestrial network is selected.

19. A radio communication system, comprising:

a radio communication device;

a terrestrial network; and a non-terrestrial network, wherein the radio communication device includes circuitry configured to:

measure a value that specifies an altitude;

determine whether to select one of the terrestrial network or the non-terrestrial network, wherein the determination is based on the measured value; and measure one of cells or beams that belong to the non-terrestrial network in a case where the non-terrestrial network is selected.

* * * * *